(12) United States Patent
Lohberg et al.

(10) Patent No.: US 6,317,674 B1
(45) Date of Patent: Nov. 13, 2001

(54) ACQUISITION AND EVALUATION OF MEASURED VARIABLES WHICH ARE CRITICAL FOR SAFETY

(75) Inventors: Peter Lohberg, Friedrichsdorf; Roland Burghardt, Frankfurt am Main, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/981,976

(22) PCT Filed: Jun. 20, 1996

(86) PCT No.: PCT/EP96/02675
§ 371 Date: Jul. 2, 1998
§ 102(e) Date: Jul. 2, 1998

(87) PCT Pub. No.: WO97/02972
PCT Pub. Date: Jan. 30, 1997

(51) Int. Cl.$^7$ ........................................ B60T 8/32
(52) U.S. Cl. .................... 701/72; 701/1; 303/113.2
(58) Field of Search .................... 701/1, 45, 72, 701/80; 303/100, 70, 113.2, 116.1

(56) References Cited

U.S. PATENT DOCUMENTS 5,938,296 * 8/1999 Nakazawa ................ 303/113.2

FOREIGN PATENT DOCUMENTS

| 40 04 086 | 8/1991 | (DE) . |
| 42 14 642 | 11/1993 | (DE) . |
| 43 41 082 | 6/1995 | (DE) . |

* cited by examiner

Primary Examiner—William A. Cuchlinski, Jr.
Assistant Examiner—Arthur D. Donnelly
(74) Attorney, Agent, or Firm—Rader, Fishman & Grauer PLLC

(57) ABSTRACT

For the acquisition and evaluation of safety-critical measured quantities, for example, of yaw rates (GR) as an input quantity of an automotive vehicle control system, the measured quantities are produced by way of two measuring channels (M1, M2) which are independent of each other. One measuring channel (M1) covers the entire measuring range, and the other measuring channel (M2) is set to a partial measuring range.

To identify errors, the output quantities of the measuring channels (M1, M2) are checked for correlation with the measured quantities acquired by the measuring channels and/or for plausibility of the measurement results.

14 Claims, 2 Drawing Sheets

ACQUISITION AND EVALUATION OF MEASURED VARIABLES WHICH ARE CRITICAL FOR SAFETY

The present invention relates to a method and an arrangement for the acquisition and evaluation of safety-critical measured quantities. These quantities include more particularly the measured quantities representative of yaw angle motions of the automotive vehicle which are required as input quantities of an automotive vehicle control system. The control systems of this type mainly include all driving stability control systems (DSC or ASMS, i.e., automatic stability management systems), but also anti-lock systems (ABS), traction slip control systems (TCS), and other systems.

Methods and arrangements for monitoring and limiting undesirable vehicle yaw motions, namely movements about the vertical vehicle axis, are known in the art. In such systems, the accelerator pedal position, the braking pressure and the rotational behavior of the individual vehicle wheels is measured by sensors. The driver's wish is concluded from these measured values, and the nominal yaw motion or yaw rate of the vehicle is calculated. Simultaneously, the transverse acceleration acting on the vehicle and the yaw rate is determined by further sensors. If the difference between the actual yaw motion of the vehicle and the nominal yaw motion exceeds a predetermined value which jeopardizes driving stability, stabilizing intervention is effected by the system by way of a controlled brake management and/or engine management, and the yaw motion is limited to allowable values.

A high degree of safety and reliability in operation is basically demanded from vehicle control systems, such as driving stability control systems, because malfunctions, for example, brake operation or braking pressure reduction at the wrong time, may cause dangerous situations. The same demands with respect to safety and reliability in operation are also placed on sensors which supply the input signals for control systems of this type. Wrong, insecure, or inexact input signals make a reliable, safe and effective control impossible. Therefore, it is necessary to permanently monitor the operation of the sensors, to signal defects or disconnect the control upon the occurrence of defects to prevent at least control in the wrong direction, e.g., erroneous braking pressure reduction.

Yaw rate sensors are required especially for driving stability control systems (DSC, ASMS). In this example of application, the sensors supply data or measured quantities which are critical with respect to safety because brake management caused by a wrong signal would naturally bear a risk for the vehicle. The prior art yaw rate sensors appropriate for use in such control systems are complicated and relatively expensive because they must satisfy the requirements of a high degree of measuring accuracy, great precision and reliability in operation. The identification of malfunctions also involves difficulties because no defined vehicle movement, which would cause a yaw velocity appropriate for calibrating the system and the sensor, can be produced. Only a possible deviation from zero point during standstill of the vehicle can be detected and corrected.

An object of the present invention is to limit or even reduce the effort and structure required for the acquisition and evaluation of such safety-critical measured quantities and to maintain or increase the safety in operation in addition.

It has been found that this object can be achieved by the method described in the accompanying main claim, the special features of the method including that the measured quantities are produced by way of two or more measuring channels which are independent of each other, one of the measuring channels covering the entire range being measured and the other measuring channel(s) covering partial measuring ranges. For error detection, the output quantities of the measuring channels are logically combined, and correlation of the measured quantities in the measuring range covered by several measuring channels and/or plausibility of the measured quantities or measurement results is checked. An arrangement for implementing the method and some favorable embodiments of this arrangement are also described in the claims.

Thus, the concept underlying the present invention is that, with respect to the example of yaw rate measurement for driving stability control, by means of one single yaw rate sensor or yaw rate measuring channel, it is impossible to achieve a sufficient degree of safety and reliability in operation because, even with maximum effort and structure in manufacture, 'stealthy' errors may occur due to certain component defects which are not identifiable. Defects of this type can be due to defective capacitors, open high-ohmic semiconductor inputs, intermittent contacts, etc. The identification of these errors must be effected indirectly by indicia which are produced from auxiliary quantities and causalities or plausibility criteria which are more or less indirectly related to the yaw action. The identification mechanism, due to its principle, therefore reacts with reduced resolution and increased inertia compared with a direct comparison method. To compensate this disadvantage, it is necessary to measure with a correspondingly still greater precision. This necessitates employing a still more exact yaw rate sensor which must satisfy the requirements of a large measuring range and increased resolution and a high degree of precision in the range of small and medium yaw rates. The relation between technical efforts and attainable accuracy, however, rises overproportionally. Despite the high amount of effort and structure, it cannot be avoided that malfunctions of the sensor remain undetected. To avoid any danger caused by erroneous data and control actions, the control system must be deactivated instantaneously in the case of a suspected malfunction already. The system behavior is indefinite when such an error occurs during a control action. Maximum requirements of reliability of the components and self-test functions of the sensor are needed to minimize the probability of such malfunctions occurring.

A redundant yaw rate measurement with two identical measuring channels or yaw rate sensors and comparison of the measuring results for correlation permits only partly minimizing the technical shortcomings of prior art systems. Immediate system activation is imperative when minor discrepancies occur. Both yaw rate sensors must cover the entire measuring range with a high degree of precision. Yaw rate sensors of this type are very costly.

Therefore, the present invention aims at a different solution. Two (or more) complete, independent measuring channels are used. only one of the channels is set to the entire measuring range, while the other channel covers only part of the range being measured, however, with a significantly higher resolution.

A great number of advantages are achieved by the method of the present invention and the corresponding order. Initially, all advantages of redundant yaw rate measurement are used by the parallel operation of two measuring channels. Mutual monitoring of the two independent measuring channels is rendered possible, and the degree of correlation of the synchronously acquired yaw rate measuring values can be assessed as a direct parameter of the operational safety of the yaw rate sensors. This monitoring action can be permanent. It permits directly and reliably identifying slowly progressing component defects in any one of the two sensors or measuring channels. System deactivation is immediate in certain situations, e.g. outside a control operation, and in the presence of defined errors. In other situations, for example, when one of the two measuring channels is subject to a defined total failure, the control system may also be operated with the remaining measuring channel alone for an emergency-operation period.

Further important advantages are due to the different design or configuration of the two measuring channels. One measuring channel covers the entire measuring range. However, because the other measuring channel observes only part of the entire measuring range, magnifies it quasi like a magnifying glass does, the greater steepness of the characteristic curve or higher resolution automatically (without increased technical efforts) achieves enhanced precision of yaw rate acquisition.

Further details of the present invention can be seen in the following description of embodiments, making reference to the accompanying drawings.

In the drawings,

FIG. 1A is only used to illustrate a yaw motion of vehicle 1, i.e. a rotation along arrow GR about the vertical axis Z of vehicle 1.

An arrangement 2 for sensing and evaluating yaw motions of the vehicle is mounted in vehicle 1. The circle, shown in dotted lines and indicated by an arrow, represents the yaw motion or yaw rate to be sensed by the arrangement 2.

The entire arrangement 2 or at least the associated yaw rate sensors are positioned in the vehicle 1 so that they perform the yaw motion to be measured along with the vehicle.

The arrangement 2 generally includes two measuring channels M1, M2 with the yaw rate sensors S1 and S2 and an electronic circuit 3. Circuit 3 comprises hard-wired circuits and/or programmed circuits, such as microprocessors, microcomputers, etc. Circuit 3 in the embodiment shown is part of a driving stability control system which is furnished with additional measured quantities or signals Sn of further sensors (transverse acceleration sensors, steering angle sensors, braking pressure sensors, etc.). Circuit 3, in turn, issues signals Sm to further controller stages or control systems of the vehicle (not shown).

The actual yaw rate sensors S1, S2 are a component part of the measuring channels M1, M2 which, in the present embodiment, beside the sensors S1, S2 still include the associated signal amplifying circuits 4, 5. Of course, these amplifying circuits could also be provided as component parts of the circuit 3 in practical operations.

Figure 1A:
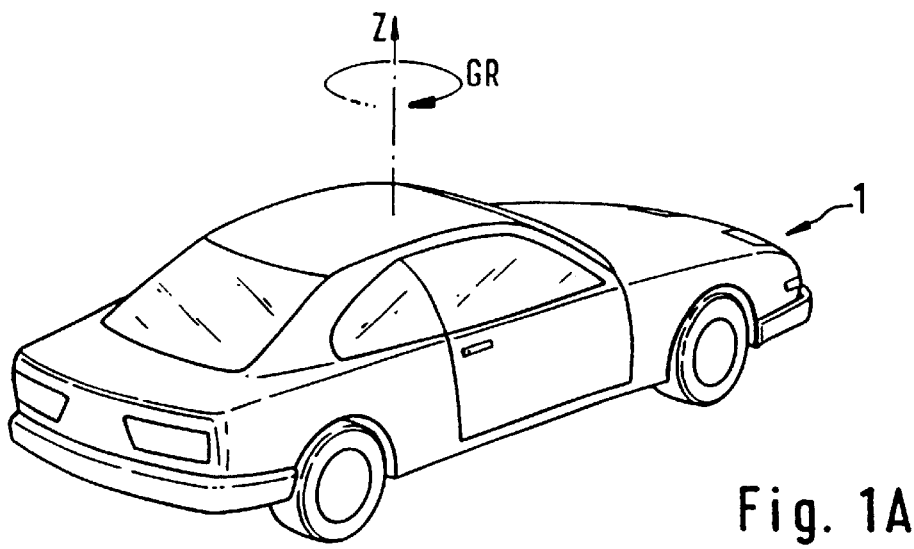
FIG. 1A is a symbolic view of a vehicle and its vertical axis.
Figure 1B:
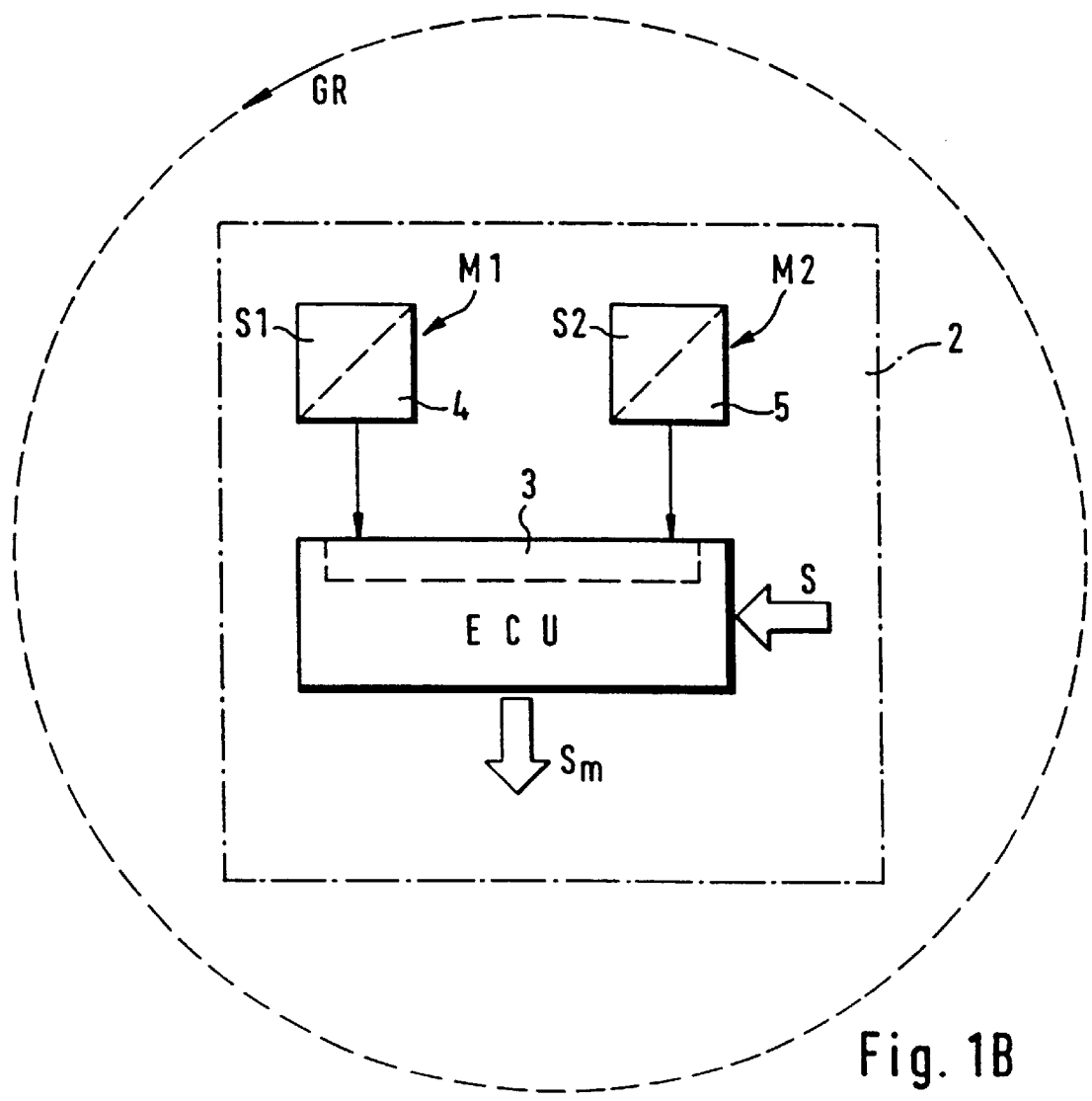
FIG. 1B is a schematic view of an arrangement of the type of the present invention.

In the embodiment of FIG. 1B, the measuring channel M1 is the channel which is set to the entire yaw rate measuring range that is to be sensed by the arrangement 2. Appropriately, the measuring channel M1 is adjusted to a measuring range of roughly ±75 deg./s ('deg./s.' is the customary spelling of angular degree per second). The measuring channel M2, however, initiates only a measuring range of roughly ±25 deg./s, that is only one third of the measuring range of the measuring channel M1.

Basically, there are several possibilities of configuring the measuring channels M1, M2. In a preferred aspect of the present invention, equal yaw rate sensors S1, S2 which are designed according to the same physical principle are used, and the sensors are adjusted to the different measuring ranges by correspondingly configuring the associated signal amplifying circuits 4, 5. For example, yaw rate sensors with a quartz tuning fork, which is supplemented by a corresponding electronic excitation circuit to become a tuning fork oscillator, are well suited for implementing the method of the present invention. Yaw rate sensors of this type can be set to the desired measuring range by correspondingly adjusting the signal amplifying factors.

In an embodiment of the present invention, two equal yaw rate sensors S1, S2 of this type are used which are operated with different scale factors invariably adjusted by signal amplifying circuits 4, 5.

The yaw rate measured quantities produced by the two measuring channels M1, M2 are recorded in parallel and evaluated in the electronic circuit 3. The yaw rate sensor S1 or the measuring channel M1 resolves the entire measuring range. In contrast thereto, the sensor S2 or the measuring range M2 is rated only to a comparatively narrow measuring range which it resolves, however, with a considerably higher degree of precision. The ratio of the factors which indicate the resolution is inversely proportional to the measuring ranges to which both measuring channels are adjusted.

The zero points of the two measuring ranges coincide in this embodiment.

Figure 2:
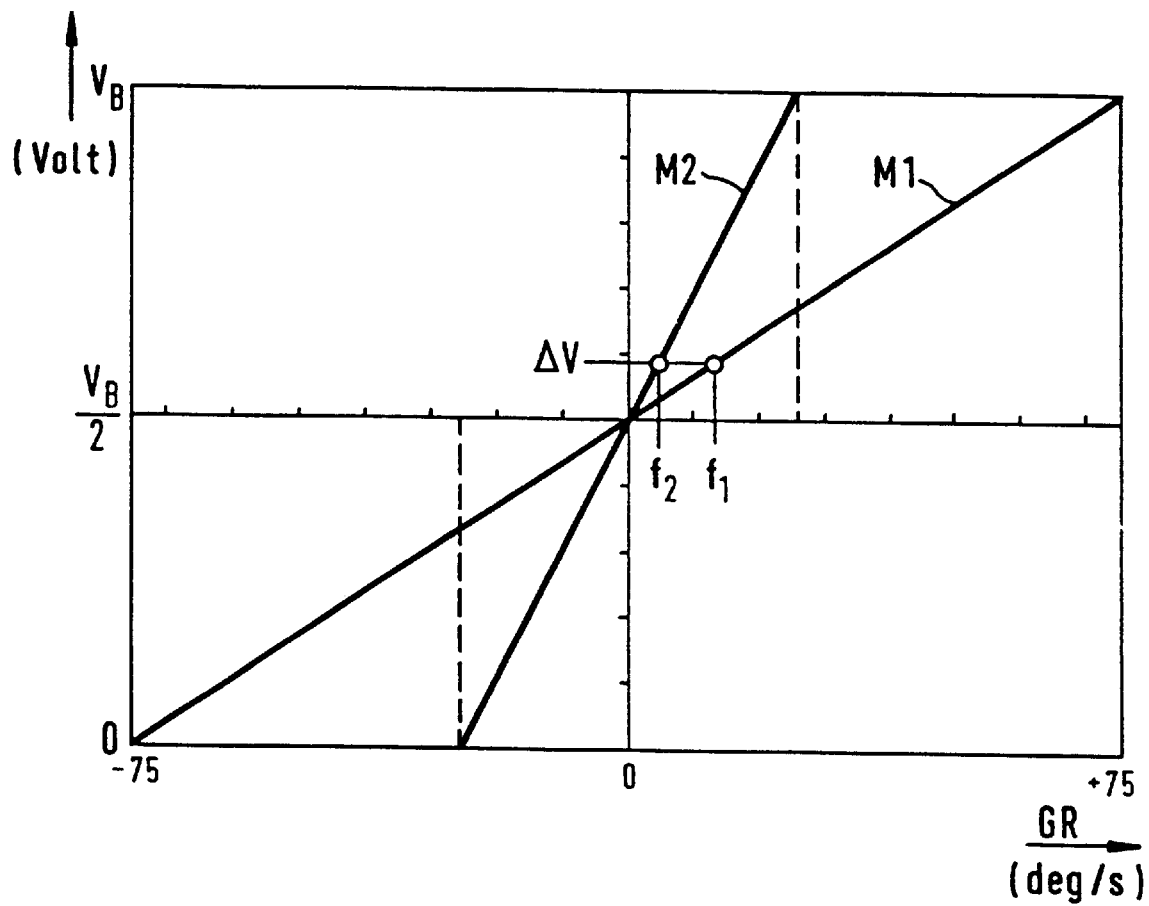
FIG. 2 is a graph showing the different characteristic curves or measuring ranges of the measuring channels of FIG. 1B.

FIG. 2 applies to such an embodiment and shows the effect of the differently adjusted measuring ranges for the yaw rate sensors S1, S2 or for the measuring channels M1, M2. The characteristic curve or voltage output $V_B$ of the measuring channels M1, M2 as a function of the yaw rate GR is shown. The rates of steepness of the transmission characteristic curves of the two measuring channels in the example illustrated have a ratio of 3:1 because the entire output voltage range $V_B$ in the measuring channel M1 is used for the resolution of ±75 deg./s. In the measuring channel M2, however, the output voltage range $V_B$ is used only to sense and resolve ±25 deg./s. An equal amount of offset $\Delta V$ (caused by an interference voltage, an inaccuracy in the signal-conditioning circuit, etc.) becomes felt as a relatively insignificant error $f_2$ with the steep characteristic curve of the measuring channel M2. The same offset in the flat characteristic curve of the measuring channel M1 rated to the entire measuring range results in the considerably higher, erroneous indication of a yaw rate $f_1$. The yaw rate sensor S2, or the measuring channel M2, so-to-speak acts as a magnifying glass because a much higher resolution becomes possible by the setting to the partial measuring range (±25 deg./s in this embodiment). This leads to an enhanced measuring accuracy and precision. According to the present invention, it is also possible to employ yaw rate sensors S1, S' which are based on physically different functional principles or have a different technical/ technological design. The setting to the entire measuring range or to a partial measuring range can be achieved by means of the associated signal-conditioning circuit or, in the evaluation of the signals, by means of circuit 3. On the other hand, yaw rate sensors may also be used which cover different measuring ranges due to their design.

Another possibility of designing the yaw rate sensors and the measuring channels includes setting the sensor S1 or the measuring channel M1 with an invariably adjusted scale factor to the entire measuring range, e.g. to ±75 deg./s, and to rate the sensor S2 or the measuring channel M2 so that its scale factor becomes variable and controllable. When the operation is started, appropriately, the scale factor of the measuring channel M2" is set to the scale factor of the measuring channel M1 so that also the entire measuring range is resolved. Depending on the dynamics of the yaw action or the necessary resolution in the respective driving or control situation, the scale factor of the measuring channel M2 is then reduced to smaller values, with the objective of adjusting the respectively valid optimal value of resolution.

In another design of the measuring channels M1, M2, the scale factor of the second measuring channel is varied in response to the dynamics of the yaw action so that the center of the resolution range of the channel M2 follows the average value of the yaw rate of the yaw action. With an average value of the yaw rate of 30 deg./s, for example, the measuring channel M2 would shift is operating point or zero point in such a manner that M2 would not resolve the partial range of ±25 deg./s but a range of 5 deg./s to 55 deg./s.

The method of the present invention is not only suitable for determining yaw rates but may also be used to acquire and evaluate safety-critical measured quantities of other types. The transverse acceleration of the vehicle can be determined with the same method in driving stability control systems. Appropriately, a first measuring channel could be set to the measuring range of ±1.5 deg./s ('g' referring to the constant of acceleration due to gravity), and a second measuring channel could be set to the measuring range of ±0.5 deg./s.

The method of the present invention is basically suited for the acquisition and evaluation of measured quantities in systems wherein a redundant acquisition is required for safety reasons and the resolution of the measuring range is important.

The method of the present invention is not only appropriate to identify errors in the acquisition and evaluation of safety-critical measured quantities but generally permits a substantially higher resolution of a measuring range by simple means. This objective is achieved by the described acquisition of measured quantities by way of measuring channels which are independent of one another. One measuring channel is set to the entire measuring range, while the other channel(s) is(are) set to partial measuring ranges. By resolving and examining the partial measuring range through a 'magnifying glass', a correspondingly higher resolution is achieved in the partial measuring range, simply as a result of the magnification.

The partial measuring range can be set to the same zero point as the entire measuring range. It is utilized that in many measurement systems or control systems the majority of control operations are performed only in a defined, relatively narrow section of the entire measuring range. However, the partial measuring range can also be adapted in the described fashion, for example, to the average value of the measured quantity.

What is claimed is:

1. A method for determining yaw rate of an automobile, comprising the step of:

measuring the yaw rate of an automobile over a predetermined range through a first channel and a second channel, wherein the first and second channels are independent of each other, the first channel measures the yaw rate over the predetermined range, and the second channel measures the yaw rate over a portion of the predetermined range.

2. A method of evaluating yaw in an automobile, comprising the steps of:

measuring the yaw rate of an automobile over a predetermined range through a first channel and a second channel, wherein the first and second channels are independent of each other, the first channel measures the yaw rate over the predetermined range, and the second channel measures the yaw rate over a portion of the predetermined range;

producing an output signal from each of the first and second channels;

correlating output signals produced by the first and second channels to a predetermined yaw rate.

3. The method of claim 2 further comprising, prior to the correlating step, the step of:

logically combining the output signals produced by the first and at least second channels.

4. A method of controlling control systems of an automobile, comprising the steps of:

measuring the yaw rate of an automobile over a predetermined range through a first channel and a second channel, wherein the first and second channels are independent of each other, the first channel measures the yaw rate over the predetermined range, and the second channel measures the yaw rate over a portion of the predetermined range;

producing an output signal from each of the first and second channels;

correlating in a logic controller the output signals produced by the first and second channels to a predetermined yaw rate; and producing at least one control signal from the logic controller to at least one control system of an automobile.

5. A device for measuring the yaw rate of an automobile comprising a first channel and a second channel connected to a logic controller, wherein the first and second channels are independent of each other, the first channel measures the yaw rate over a predetermined range, and the second channel measures the yaw rate over a portion of the predetermined range, and wherein the logic controller correlates output signals produced by the first and second channels to a predetermined yaw rate.

6. The device of claim 5 wherein the first and second channels comprise a yaw rate sensor and a signal amplifying circuit.

7. The device of claim 6 wherein the same type of yaw rate sensor is used in both the first and second channels.

8. The device of claim 5 wherein the yaw rate sensor is a quartz tuning fork type sensor.

9. The device of claim 5 wherein the second channel measures yaw rate over a variable range.

10. The device of claim 9 wherein the variable range varies in response to a yawing motion.

11. The device of claim 5 wherein the range of the second channel has a center which adjusts to the average value of the yaw rate of a yawing motion.

12. The device of claim 5 wherein the predetermined range is up to ±85 degrees/s and the portion of the predetermined range is up to ±30 degrees/s.

13. The device of claim 5 wherein the logic controller issues at one control signal to at least one control system of an automobile.

14. The device of claim 13 further comprising a control system which receives the outputs issued by the logic controller.

* * * * *